United States Patent
Arimilli et al.

(10) Patent No.: US 6,298,416 B1
(45) Date of Patent: Oct. 2, 2001

(54) METHOD AND APPARATUS FOR TRANSMITTING CONTROL SIGNALS WITHIN A HIERARCHIAL CACHE MEMORY ARCHITECTURE FOR A DATA PROCESSING SYSTEM

(75) Inventors: Ravi Kumar Arimilli; Lakshminarayana Baba Arimilli; James Stephen Fields, Jr.; Sanjeev Ghai; Praveen S. Reddy, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/437,040

(22) Filed: Nov. 9, 1999

(51) Int. Cl.[7] ....................................... G06F 12/08
(52) U.S. Cl. ................................................. 711/122
(58) Field of Search ................... 711/122, 117; 712/214, 215

(56) References Cited

U.S. PATENT DOCUMENTS 5,081,873 * 1/1992 Kikuchi et al. ...................... 711/131
5,802,571 * 9/1998 Konigsburg et al. ................ 711/143
6,219,751 * 4/2001 Hodges ................................. 711/114

* cited by examiner

Primary Examiner—Hiep T. Nguyen
(74) Attorney, Agent, or Firm—Casimer K. Salys; Bracewell & Patterson, L.L.P.

(57) ABSTRACT

A method and apparatus for transmitting control signals within a hierarchial cache memory architecture of a data processing system is disclosed. The cache memory hierarchy includes multiple levels of cache memories, each level may have a different size and speed. In response to a processor request for information, a control command is sent to the cache memory hierarchy. The control command includes multiple control blocks. Beginning at the lowest possible cache level of the cache memory hierarchy, a determination is made whether or not there is a cache hit at a current level of the cache memory hierarchy. In response to a determination that there is not a cache hit at the current level, an abbreviated control command is sent to an upper cache level of the cache memory hierarchy, after a control block that corresponds to the current level is removed from the control command.

6 Claims, 4 Drawing Sheets

METHOD AND APPARATUS FOR TRANSMITTING CONTROL SIGNALS WITHIN A HIERARCHIAL CACHE MEMORY ARCHITECTURE FOR A DATA PROCESSING SYSTEM

CROSS-REFERENCE TO A RELATED PATENT APPLICATION

The present invention is related to the subject matter of a co-pending United States Patent Application entitled "METHOD AND APPARATUS FOR FORWARDING DATA IN A HIERARCHIAL CACHE MEMORY ARCHITECTURE," filed on even date, Ser. No. 09/435,962 (IBM Docket No. AT9-99-617).

BACKGROUND OF THE INVENTION

1. Technical Field

The present invention relates to data processing systems in general and, in particular, to data processing systems having a hierarchial cache memory architecture. Still more particularly, the present invention relates to a method and apparatus for transmitting control signals within a hierarchial cache memory architecture for a data processing system.

2. Description of the Prior Art

A data processing system typically includes a processor coupled to a variety of storage devices arranged in a hierarchial manner. Hardware and/or software can dynamically allocate parts of the storage devices within the hierarchy for addresses deemed most likely to be accessed soon. The type of storage employed in each hierarchical level relative to the processor is normally determined by balancing the requirements for speed, capacity, and cost.

In addition to a main memory, a commonly employed storage device in the hierarchy includes a high-speed memory known as a cache memory. A cache memory speeds the apparent access times of the relatively slower main memory by retaining the instructions and/or data that the processor will most likely access again soon, and making the instructions and/or data available to the processor at a much lower latency. As such, cache memory enables relatively fast access to a subset of instructions and/or data that were recently transferred from the main memory to the processor, and thus improves the overall speed of the data processing system.

A multi-level cache memory hierarchy is a cache memory system consisting of several levels of cache memories, each level having a different size and speed. Typically, the first level cache memory, commonly known as the level one (L1) cache, has the fastest access time and the highest cost per bit relative to the other levels of cache memories. The remaining levels of cache memories, such as level two (L2) caches, level three (L3) caches, etc., have a relatively slower access time but also a relatively lower cost per bit. Typically, each lower cache memory level has a progressively slower access time and a lower per-bit cost. The present disclosure provides a method and apparatus for transmitting control signals between each level of cache memories within a hierarchial cache memory architecture.

SUMMARY OF THE INVENTION

In accordance with a preferred embodiment of the present invention, a cache memory hierarchy includes multiple levels of cache memories, each level may have a different size and speed. In response to a processor request for information, a control command is sent to the cache memory hierarchy. The control command includes multiple control blocks. Beginning at the lowest possible cache level of the cache memory hierarchy, a determination is made whether or not there is a cache hit at a current level of the cache memory hierarchy. In response to a determination that there is not a cache hit at the current level, an abbreviated control command is sent to a lower cache level of the cache memory hierarchy, after a control block that corresponds to the current level is removed from the control command.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
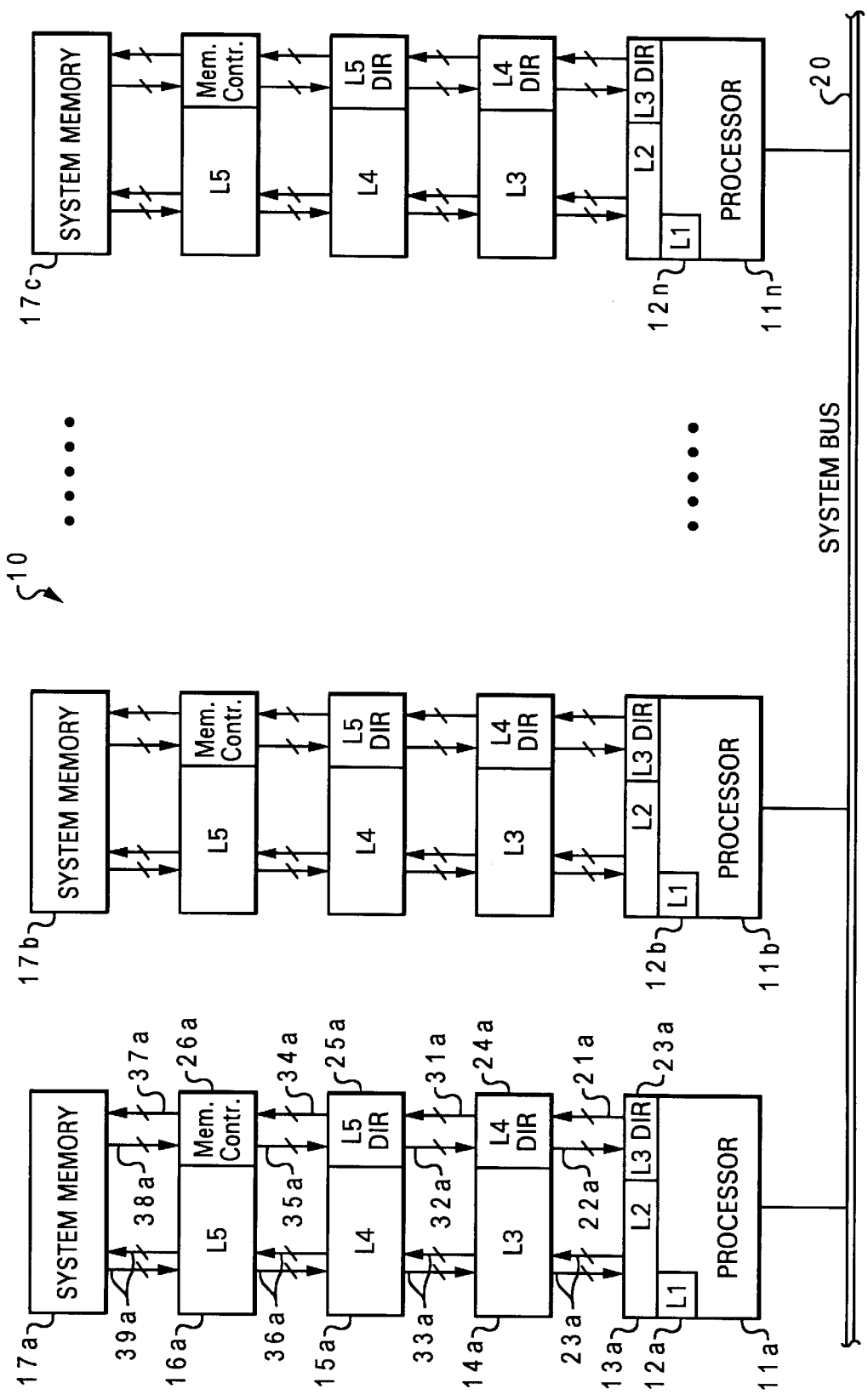
FIG. 1 is a block diagram of a data processing system in which a preferred embodiment of the present invention is incorporated.

The present invention may be implemented in any data processing system having multiple levels of cache memories organized in a hierarchical manner. Referring now to the drawings and in particular to FIG. 1, there is depicted a block diagram of a data processing system in which a preferred embodiment of the present invention is incorporated. As shown, a data processing system 10 includes central processing units (CPUs) 11a–11n. CPUs 11a–11n are interconnected to each other through a system interconnect 20. System interconnect 20 may be implemented as bus or a switch.

In addition, each of CPUs 11a–11n has an associated multi-level cache memory hierarchy. In this implementation, each of CPUs 11a–11n has five levels of cache memories. Preferably, level one (L1) caches and level two (L2) caches are contained with a CPU. For example, CPU 11a contains an L1 cache 12a and an L2 cache 13a; and CPU 11b contains an L1 cache 12b and an L2 cache 13b. The remaining levels of cache memories are stacked on each other to form a cache memory hierarchy. For example, a level three (L3) cache 14a is coupled to a level four (L4) cache 15a; L4 cache 15a is coupled to a level five (L5) cache 16a; and L5 cache 16a is coupled to a system memory 17a. System memories 17a–17n are preferably shared by all of CPUs 11a–11n. An L1 cache is located at the top of each cache memory hierarchy.

Each level of cache memory contains a cache directory and a cache controller for the next upper level cache memory. For example, L2 cache 13a includes an L3 cache directory and controller 23a; L3 cache 14a includes an L4 cache directory and controller 24a; and L4 cache 15a includes and L5 cache directory and controller 25a. Similarly, L5 cache 16a includes a system memory controller 26a for controlling system memory 17a.

Data is transmitted between each cache level of the cache memory hierarchy via two data buses. For example, data travel between L2 cache 13a and L3 cache 14a via data buses 23a. Data travel between L3 cache 14a and L4 cache 15a via data buses 33a. Data travel between L4 cache 15a and L5 cache 16a via data buses 36a. Similarly, data travel between L5 cache 16a and system memory 17a via data buses 39a. Each data bus is preferably 144 bits wide.

The communication between levels of the cache memory hierarchy is controlled via a control bus and a response bus. For example, L3 cache directory and controller 23a communicates with L4 cache directory and controller 24a via control bus 21a and response bus 22a. L4 cache directory and controller 24a communicates with L5 cache directory and controller 25a via control bus 31a and response bus 32a. L5 cache directory and controller 25a communicates with system memory controller 26a via control bus 34a and response bus 35a. Similarly, system memory controller 26a communicates with system memory 17a via control bus 37a and response bus 38a. A control command may be sent from a processor to various levels of caches via a corresponding control bus.

Figure 2:
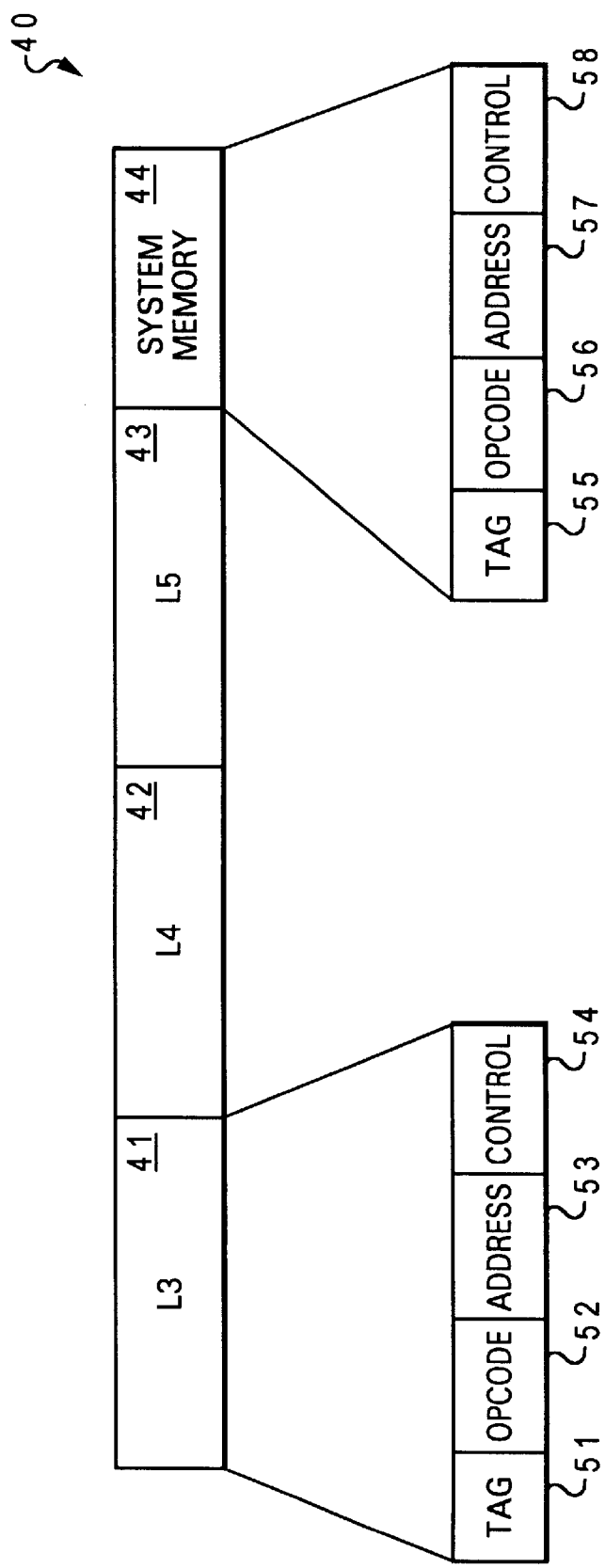
FIG. 2 is a block diagram of a control command, in accordance with a preferred embodiment of the present invention.

With reference now to FIG. 2, there is illustrated a block diagram of a control command in accordance with a preferred embodiment of the present invention. As shown, a control command 40, which can be utilized within the control buses of the cache memory hierarchy from FIG. 1, includes four control blocks, namely an L3 control block 41, an L4 control block 42, an L5 control block 43, and a system memory control block 44. As the control block names imply, each of control blocks 41–43 corresponds to a cache memory level, and system memory control block 44 corresponds to a shared system memory.

In this implementation, for example, L3 control block 41 corresponds to L3 cache 14a, L4 control block 42 corresponds to L4 cache 15a, L5 control block 43 corresponds to L5 cache 16a, and system memory control block 44 corresponds to system memory 17a. Each of control blocks 41–44 contains multiple fields. For example, L3 control block 41 contains a tag field 51, an opcode field 52, a cache address field 53, and a control bit field 54. Each of fields 51–54 is used to check whether or not there is a cache "hit" and control the normal operation of a cache memory, as those fields are known to those skilled in the relevant art. Each of control blocks 42 and 43 preferably contains a tag field, an opcode field, a cache address field, and a control bit field identical to those in control block 41. Similarly, control block 44 contains a tag field 55, an opcode field 56, an address field 57, and a control bit field 58. Each of fields 55–58 is used to control the normal operation and obtain data from a system memory, as those fields are known to those skilled in the relevant art.

The length of each of fields 51–58 depends on a specific cache memory hierarchy. In this example, tag field 51 is eight bits wide, opcode field 52 is six bits wide, address field 53 is 18 bits wide, and control field 54 is nine bits wide. As control command 40 travels "upstream" through control buses 21a, 31a, 34a, and 37a, some of control blocks 41–44 can be removed. For example, if there is a cache "miss" in L3 cache 14a, L3 control block 41 is removed from control command 40 before control command 40 is sent to bus 31a. Similarly, if there is a cache "miss" in L4 cache 15a, L4 control block 42 is removed from control command 40 before control command 40 is sent to control bus 34a. Thus, the width of control bus 34a is preferably narrower than that of control bus 31a, and the width of control bus 37a is preferably narrower than that of control bus 34a.

Figure 3:
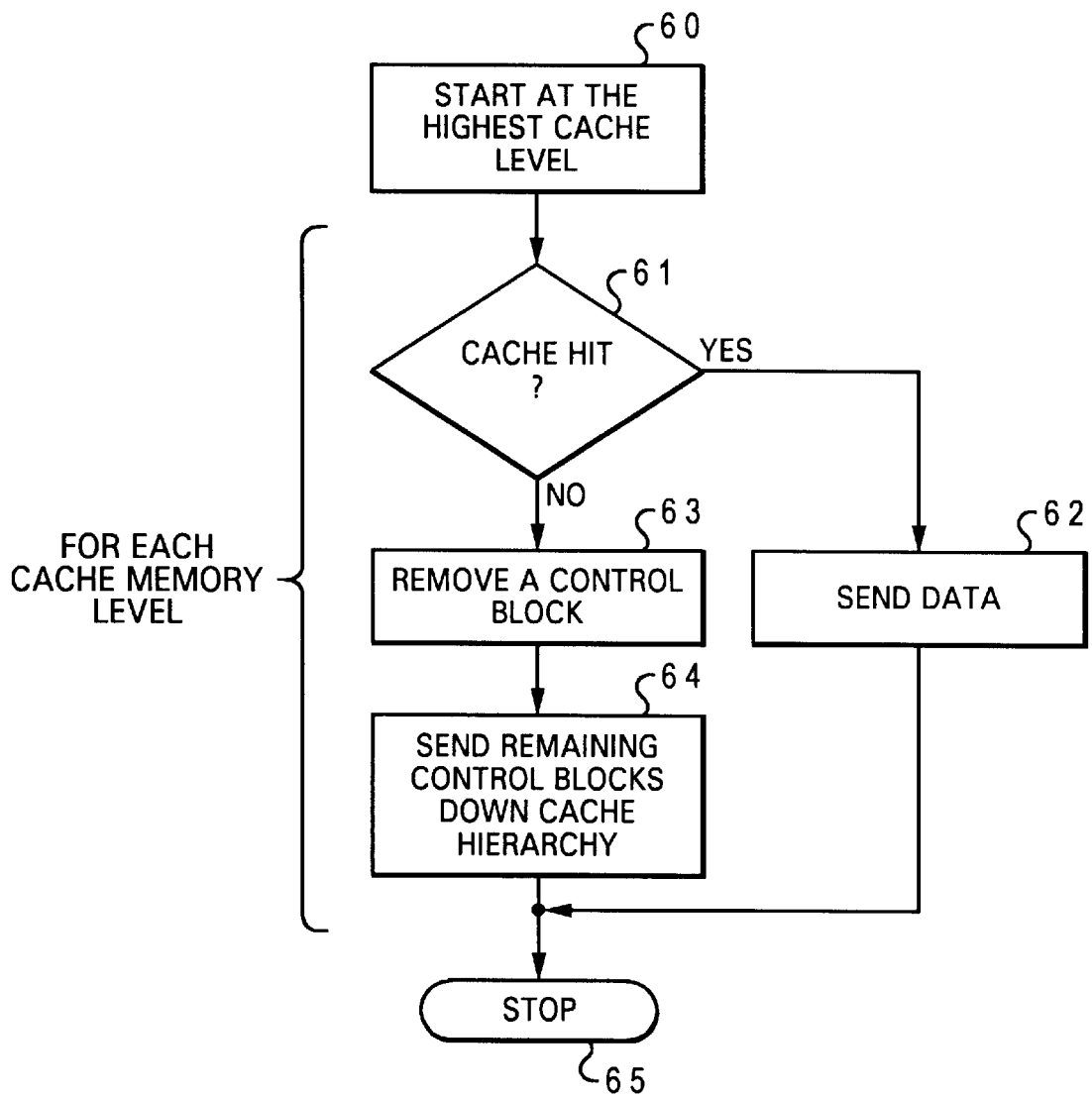
FIG. 3 is a high-level logic flow diagram of a method for transmitting control signals within the hierarchial cache memory architecture for the data processing system from FIG. 1, in accordance with a preferred embodiment of the present invention.

Referring now to FIG. 3, there is illustrated a high-level logic flow diagram of a method for transmitting control signals within a hierarchial cache memory architecture of a data processing system, in accordance with a preferred embodiment of the present invention. The method begins at the highest possible cache memory level (i.e., closest to the data requesting processor) of the cache memory hierarchy, as shown in block 60. For each cache memory level, a determination is made as to whether or not there is a cache "hit" at the current cache memory level, as shown in block 61. If there is a cache "hit" at the current cache memory level, the data is sent from the corresponding cache to the data requesting processor, as depicted in block 62. The process can then stop at this point, meaning that the control command is not transmitted to any lower levels of the memory hierarchy.

Otherwise, if there is a cache "miss" at the current cache memory level, a control block corresponding to the current cache memory level is removed from the control command, as illustrated in block 63. Then, the remaining portion of the control command is sent "down" the cache hierarchy, as shown in block 64. This process continues until either the control command is serviced or reaches the system memory located at the "bottom" of the cache memory hierarchy.

Figure 4:
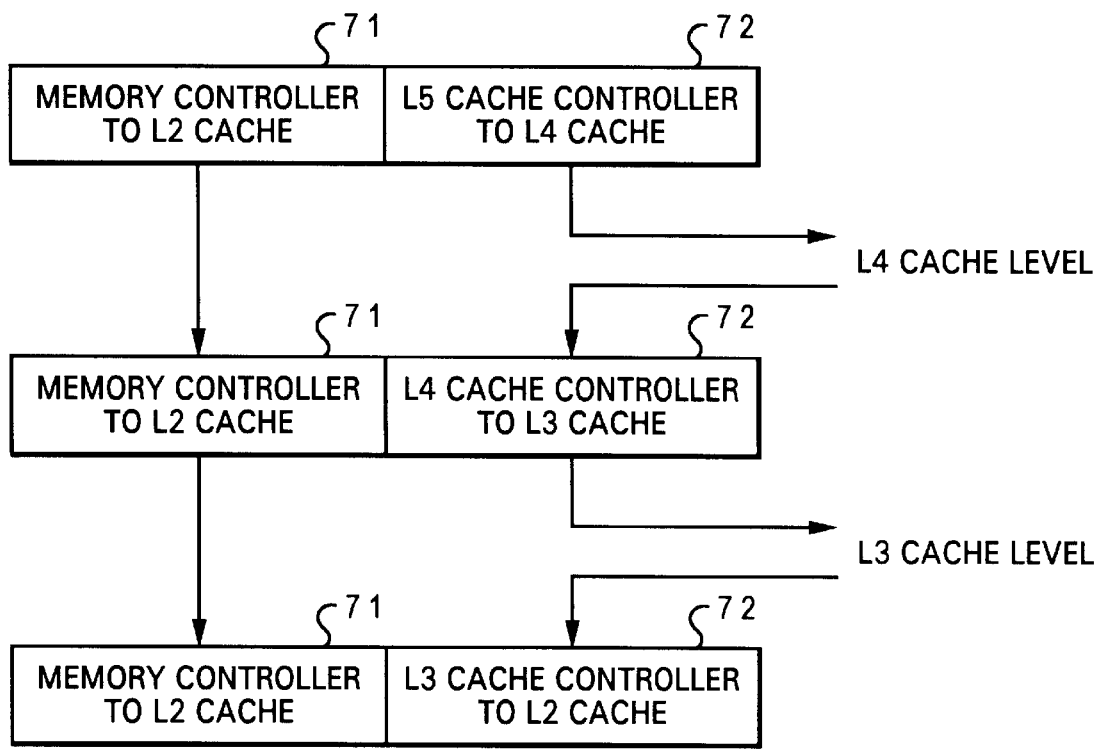
FIG. 4 is a flow diagram of a response, within the hierarchial cache memory architecture for the data processing system from FIG. 1, in accordance with a preferred embodiment of the present invention.

A response, such as data valid, etc., at each cache memory level can be sent "up" the cache memory hierarchy via a corresponding response bus in a similar fashion; that is, the size of the response being reduced as the response is travelling "up" the cache memory hierarchy. With reference now to FIG. 4, there is illustrated a flow diagram of a response, in accordance with a preferred embodiment of the present invention. As shown, a response includes two fields, a first response field 71 and a second response field 72. In this implementation, first response field 71 contains a response from a controller where a cache "hit" occurs. For example, in FIG. 4, when there is a cache "miss" at all cache levels and the requested information has to be obtained from the system memory, first response field 71 is filled with response information from the system memory controller to L2 cache. If the cache "hit" occurs at the L5 cache, then first response field 71 will be filled with response information from the L5 cache controller to L2 cache. The contents of first response field 71 preferably remain the same as the response travels "up" the cache memory hierarchy.

On the other hand, the contents of second response field 72 changes as the response travels "up" the cache memory hierarchy. In this example, at the L4 cache level, a response from the L5 cache controller intended for the L4 cache is extracted from second response field 72 while a response from the L4 cache controller intended for the L3 cache is inserted into second response field 72. After the response travels "up" to the L3 cache level, the response from the L4 cache controller intended for the L3 cache is extracted from second response field 72 while a response from the L3 cache controller intended for the L2 cache is inserted into second response field 72.

As has been described, the present invention provides a method and apparatus for transmitting control signals within a hierarchial cache memory architecture of a data processing system. With the present invention, the transmission of control signals between different levels of a cache memory hierarchy can be more efficient.

Although a five-level cache memory hierarchy is used to described the present invention, it should be understood that the present invention can be practiced within a variety of system configurations. While the above techniques apply to cache memories, and specifically to a hierarchical cache memory structure in a data processing system, they are adaptable and contemplated to be useful in conjunction with other memory structures and other storage devices within a data processing system.

While the invention has been particularly shown and described with reference to a preferred embodiment, it will be understood by those skilled in the art that various changes in form and detail may be made therein without departing from the spirit and scope of the invention.

What is claimed is:

1. A method of transmitting control signals within a hierarchial cache memory architecture of a data processing system, said method comprising:

in response to a processor request for information, sending a control command to said cache memory hierarchy, wherein said control command includes a plurality of control blocks; and at each cache memory level of said cache memory hierarchy, determining whether or not there is a cache hit; and in response to a determination that there is not a cache hit at a current cache memory level, sending said control command to an upper cache memory level within said cache memory hierarchy after removing a control block from said control command, wherein said removed control block corresponds to said current cache memory level.

2. The method according to claim 1, wherein said method further includes sending data to said processor, in response to a determination that there is a cache hit at said current cache memory level.

3. The method according to claim 1, wherein said method further includes sending a response to a lower cache memory level within said cache memory hierarchy.

4. An apparatus for transmitting control signals within a hierarchial cache memory architecture of a data processing system, said apparatus comprising:

means for sending a control command to said cache memory hierarchy, in response to a processor request for information, wherein said control command includes a plurality of control blocks; and at each cache memory level of said cache memory hierarchy, means for determining whether or not there is a cache hit; and means for sending said control command to an upper cache memory level within said cache memory hierarchy after removing a control block from said control command, in response to a determination that there is not a cache hit at a current cache memory level, wherein said removed control block corresponds to said current cache memory level.

5. The apparatus according to claim 4, wherein said apparatus further includes a means for sending data to said processor, in response to a determination that there is a cache hit at said current cache memory level.

6. The apparatus according to claim 4, wherein said apparatus further includes a means for sending a response to a lower cache memory level within said cache memory hierarchy.

* * * * *

UNITED STATES PATENT AND TRADEMARK OFFICE
CERTIFICATE OF CORRECTION

PATENT NO. : 6,298,416 B1
DATED : October 2, 2001
INVENTOR(S) : Arimilli et al.

Page 1 of 1

It is certified that error appears in the above-identified patent and that said Letters Patent is hereby corrected as shown below:

Column 3,
Line 4, delete the words "includes and" and replace them with the words -- includes an --.

Column 4,
Line 1, add the word -- control -- between the words "to" and "bus".

Signed and Sealed this

Thirtieth Day of April, 2002

Attest:

Attesting Officer

JAMES E. ROGAN
Director of the United States Patent and Trademark Office